(12) United States Patent
Kanda et al.

(10) Patent No.: US 7,258,929 B2
(45) Date of Patent: Aug. 21, 2007

(54) GAS-BARRIER MULTI-LAYER STRUCTURE

(75) Inventors: Tomomichi Kanda, Kanagawa (JP); Akira Mori, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 260 days.

(21) Appl. No.: 10/682,027

(22) Filed: Oct. 10, 2003

(65) Prior Publication Data

US 2004/0076781 A1    Apr. 22, 2004

(30) Foreign Application Priority Data

Oct. 22, 2002    (JP)    ............................. 2002-306692

(51) Int. Cl.
*B32B 27/34*    (2006.01)
*B32B 27/32*    (2006.01)

(52) U.S. Cl. ................. 428/474.4; 428/476; 428/36.91

(58) Field of Classification Search ............. 428/474.4, 428/476.3, 476.9, 34.1, 35.7, 36.91, 475.2; 528/310, 170, 322, 332, 335, 336, 480
See application file for complete search history.

(56) References Cited

U.S. PATENT DOCUMENTS 4,908,272 A * 3/1990 Harada et al. .............. 428/412
5,028,462 A * 7/1991 Matlack et al. ............ 428/35.7
5,576,415 A * 11/1996 Tanaka ........................ 528/310
6,303,741 B1 * 10/2001 Tanaka ........................ 528/332

FOREIGN PATENT DOCUMENTS

EP    0 409 666    1/1991

OTHER PUBLICATIONS

European Search Report transmitted Jan. 2, 2004 for EP No. 03 02 2701.

* cited by examiner

*Primary Examiner*—Thao Tran
(74) *Attorney, Agent, or Firm*—Antonelli, Terry, Stout & Kraus, LLP.

(57) ABSTRACT

The gas-barrier multi-layer structure of the present invention comprises at least one gas-barrier layer A and at lease one thermoplastic resin layer B. The gas-barrier layer A comprises a crystallizable polyamide resin which is produced by the polycondensation of a diamine component mainly comprising m-xylylenediamine with a dicarboxylic acid component comprising a $C_4$-$C_{20}$ $\alpha,\omega$-linear aliphatic dicarboxylic acid and isophthalic acid in a specific proportion so as to have a particular crystallization behavior. The gas-barrier multi-layer structure is excellent in the fabricability such as deep drawing ability and can be fabricated into a highly transparent shaped article with less discoloration and malodor generation.

13 Claims, No Drawings

GAS-BARRIER MULTI-LAYER STRUCTURE

BACKGROUND OF THE INVENTION

1. Field of the Invention

The present invention relates to a multi-layer structure having excellent gas-barrier properties, and more particularly to a multi-layer structure having a good fabricability such as deep drawing ability, less malodor and discoloration and excellent transparency, heat resistance and gas-barrier properties.

2. Description of the Prior Art

Polyamides produced by the polycondensation of xylylenediamine and an aliphatic dicarboxylic acid, for example, polyamides produced from m-xylylenediamine and adipic acid (hereinafter referred to merely as "nylon MXD6") have been extensively used as gas-barrier packaging materials such as films and bottles because of their high strength, high elastic modulus and low permeability to gaseous substances such as oxygen and carbon dioxide.

The nylon MXD6 exhibits a good heat stability upon melting as compared to other gas-barrier resins, and therefore, can be co-extruded or co-injection-molded with other thermoplastic resins such as polyethylene terephthalate (hereinafter refer to as merely "PET"), nylon 6 and polypropylene. Therefore, the nylon MXD6 is recently increasingly used as a gas-barrier layer of a multi-layer structure.

Usually, the multi-layer structure composed of a thermoplastic resin is heated to a temperature not less than the softening point or glass transition point of the resin constituting the multi-layer structure to fabricate it into containers, etc., by deep draw forming or blow molding. However, in the case of crystallizable thermoplastic resins, crystallization occurs at the glass transition point or higher temperatures, and the crystallization rate increases with the temperature rise until reaching a certain temperature. Therefore, because of the crystallization, the thermoforming may become impossible in the fabrication which requires high temperatures or prolonged preheating time.

A gas-barrier multi-layer container having a polyolefin layer made of polyethylene, polypropylene, etc., and a nylon MXD6 layer is proposed in Japanese Patent Publication No. 56-23792. However, the polyolefin used in the above multi-layer structure has a softening point usually higher than the glass transition point of nylon MXD6, and therefore, an adequate temperature for the fabrication is much higher than the glass transition point of nylon MXD6, thereby making the crystallization easy to occur. In particular, at around an adequate temperature for the fabrication of polypropylene, usually near 160° C., the crystallization rate of nylon MXD6 becomes very high. If the fabrication of the multi-layer structure is conducted in the highly crystallized state, the nylon MXD6 layer suffers from uneven thickness and whitening, thereby failing to obtain shaped articles that are practically satisfactory in shape and properties such as transparency. Therefore, the multi-layer structure having the above construction has been conventionally fabricated by in-line molding method in which the multi-layer structure immediately after melt-extrusion is fabricated at a temperature higher than the crystallization temperature, or under limited conditions in which the multi-layer structure is rapidly preheated for a short period of time so as to prevent the crystallization.

To improve the fabricability, etc., Japanese Patent Application Laid-Open No. 1-141737 proposes a multi-layer structure comprising a layer made of a mixture of nylon MXD6 and a hardly-crystallizable or amorphous polyamide resin and a layer made of another thermoplastic resin. However, since the polyamide mixed with nylon MXD6 shows a lower gas-barrier property than that of nylon MXD6, the resultant multi-layer structure has low gas-barrier properties. Thus, it has been difficult to obtain a multi-layer structure fully satisfying both the fabricability and the gas-barrier properties.

A crystallizable thermoplastic resin is usually processed at its melting point or higher temperatures. When a polyolefin and a higher-melting crystallizable polyamide are co-extruded into a multi-layer structure, a polyolefin resin layer and a polyamide resin layer both in a molten state are contacted with each other in a feed block. As a result, the polyolefin resin is subject to a severe heat history. In particular, in the production of a multi-layer structure containing polypropylene, discoloration, malodor generation, etc. due to heat degradation of the polypropylene resin unfavorably occur.

The glass transition point of the nylon MXD6 is usually about 85° C., but lowered upon the absorption of water. For example, the multi-layer structure comprising a nylon MXD6 layer and a PET layer which is produced by a stretch blow molding shrinks drastically when immersed in a hot water of 80° C. or higher. Therefore, when a multi-layer structure containing nylon MXD6 is applied to containers for foodstuffs or beverages which are subjected to a hot water treatment or a high-temperature filling for sterilization, it is necessary to subject the multi-layer structure to treatments accompanied by crystallization such as stretch heat-setting.

As described above, it has been demanded to develop a multi-layer structure comprising a combination of nylon MXD6 and another thermoplastic resin which is excellent in the fabricability such as deep drawing ability and stretch blowing ability, and is capable of providing containers that are fully satisfactory in transparency, heat resistance, appearance and gas-barrier properties.

SUMMARY OF THE INVENTION

An object of the present invention is to provide a multi-layer structure excellent in fabricability such as deep drawing ability, transparency and gas-barrier properties which can be produced or fabricated into shaped articles with less discoloration and malodor generation. Another object of the present invention is to provide a container at least partly made of the multi-layer structure.

As a result of extensive studies in view of the above object, the present inventors have found that a multi-layer structure containing a polyamide resin having a specific monomer composition and a specific crystallization rate is excellent in the fabricability such as deep drawing ability, gas-barrier properties, transparency and heat resistance with little malodor generation and discoloration. The present invention has been accomplished on the basis of this finding.

Thus, the present invention provides a gas-barrier multi-layer structure comprising at least one gas-barrier layer A and at least one thermoplastic resin layer B, the gas-barrier layer A comprising a crystallizable polyamide resin produced by polycondensing a diamine component containing 70 mol % or more of m-xylylenediamine with a dicarboxylic acid component containing 80 to 97 mol % of a $C_4$-$C_{20}$ α,ω-linear aliphatic dicarboxylic acid and 3 to 20 mol % of isophthalic acid, and the crystallizable polyamide resin having a minimum half crystallization time of 40 to 2,000 s in a measuring temperature range from a glass transition point thereof to less than a melting point thereof when measured by isothermal crystallization according to depolarization photometry.

The present invention also provides a multi-layer container at least partly comprising the multi-layer structure.

DETAILED DESCRIPTION OF THE INVENTION

The polyamide resin for the gas-barrier layer A is produced by polycondensing a diamine component containing 70 mol % or more of m-xylylenediamine with a dicarboxylic acid component containing 80 to 97 mol % of a $C_4$ to $C_{20}$ α,ω-linear aliphatic dicarboxylic acid and 3 to 20 mol % of isophthalic acid.

The above polyamide may be produced by a melt polycondensation, for example, by heating a nylon salt of m-xylylenediamine, adipic acid and isophthalic acid under pressure in the presence of water, thereby allowing the polymerization to proceed in the molten state while removing water added and water eliminated by polycondensation. Alternatively, an atmospheric polycondensation may be employed, where m-xylylenediamine is directly added, for example, to a molten mixture of adipic acid and isophthalic acid. To prevent the reaction system from being solidified, the atmospheric polycondensation is proceeded by continuously adding m-xylylenediamine and heating the reaction system so as to keep the reaction temperature not lower than the melting points of oligoamide and polyamide being produced.

The polyamide obtained by the melt polycondensation having a relatively low molecular weight usually has a relative viscosity of 1.6 to 2.28 when measured on a solution of 1 g of the polyamide resin in 100 ml of 96% sulfuric acid. If the relative viscosity after the melt polymerization is 2.28 or lower, a high-quality polyamide showing a good color tone with less gel-like matters can be obtained. However, the low viscosity in turn causes drawbacks, for example, draw down or gradual thickening of the polyamide layer toward the edges of sheets occurs when formed into the multi-layer shaped articles such as films, sheets and bottles, and the thickness of the polyamide layer becomes uneven in the production of a bottle preform, thereby making the production of uniform multi-layer shaped articles difficult. To eliminate these drawbacks, the melt-polymerization polyamide having a relatively low molecular weight is further subjected to solid-phase polymerization, if required. The polyamide having a relatively low molecular weight is pelletized or powdered, and then subjected to solid-phase polymerization at 150° C. to the melting point of the polyamide by heating under reduced pressure or in an inert gas atmosphere. If multi-layer shaped articles of sheet, film or stretched blown bottle shapes are intended, the relative viscosity of the solid-phase polymerized polyamide is preferably 2.3 to 4.2. When the relative viscosity lies in the above range, the resultant multi-layer shaped articles are substantially free from drawbacks such as the draw-down and the gradual thickening of the polyamide layer toward edges of films or sheets.

The diamine component as the raw material for the polyamide resin used in the present invention contains 70 mol % or more (inclusive of 100 mol %) of m-xylylenediamine. The diamine component may contain a diamine other than m-xylylenediamine in an amount of 30 mol % or less based on the whole diamine component. Examples of other diamines include aliphatic diamines such as tetramethylenediamine, pentamethylenediamine, hexamethylenediamine, octamethylenediamine and nonamethylenediamine; aromatic diamines such as p-phenylenediamine and p-xylylenediamine; and alicyclic diamines such as bis(aminomethyl)cyclohexane.

The dicarboxylic acid component as the raw material of the polyamide resin used in the present invention contains 80 to 97 mol %, preferably 85 to 97 mol % and more preferably 85 to 95 mol % of a $C_4$ to $C_{20}$ α,ω-linear aliphatic dicarboxylic acid. Examples of the $C_4$ to $C_{20}$ α,ω-linear aliphatic dicarboxylic acid include aliphatic dicarboxylic acids such as succinic acid, glutaric acid, pimelic acid, suberic acid, azelaic acid, adipic acid, sebacic acid, undecanedioic acid and dodecandioic acid, with adipic acid being preferred.

The dicarboxylic acid component also contains 3 to 20 mol %, preferably 3 to 15 mol % and more preferably 5 to 15 mol % of isophthalic acid. By the use of isophthalic acid in the above amount range, the melting point of the resultant polyamide is lowered to enable the molding at lower temperatures as compared with the sole use of the $C_4$ to $C_{20}$ α,ω-linear aliphatic dicarboxylic acid, thereby improving the moldability and processability. In addition, the crystallization rate of the polyamide resin is reduced, the fabricability such as deep drawing ability is improved. If the isophthalic acid content is less than 3 mol %, it is impossible to improve the fabricability by the reduction of the crystallization rate while maintaining the good gas-barrier properties. In addition, since the depression of the melting point is small, it is difficult to prevent the degradation of the resins other than the polyamide resin, in particular, it is difficult to prevent polypropylene from generating malodor or discoloring by lowering the molding temperature of the multi-layer structure, and also difficult to improve the moldability and processability. If the isophthalic acid content exceeds 20 mol %, although the moldability and fabricability can be improved because the melting point is lowered and the crystallization rate is considerably reduced, the glass transition point is lowered by water absorption due to low crystallizability, this softening the polyamide resin layer upon a hot water treatment thereby likely to cause the deformation of the multi-layer structure and multi-layer shaped articles and also cause the elution of a part of the polyamide resin layer. In addition, if the crystallizability is excessively reduced by the use of isophthalic acid exceeding 20 mol %, pellets and powders are fuse-bonded to each other during the drying step or the solid-phase polymerization process to make the production of the multi-layer structure and its raw materials difficult.

The polyamide resin used in the present invention is a crystallizable polymer and has a minimum half crystallization time of 40 to 2,000 s, preferably 40 to 1,000 s in a measuring temperature range from its glass transition point to less than its melting point when measured by isothermal crystallization according to depolarization photometry. By the use of such a crystallizable polyamide resin, the deformation or shrinkage of the multi-layer structure and multi-layer shaped articles during the hot water treatment is prevented. By controlling the minimum half crystallization time to 40 s or longer, the whitening due to crystallization and the forming defects during the fabrication such as deep drawing of the multi-layer structure is prevented. If the minimum half crystallization time exceeds 2,000 s, namely, the half crystallization time exceeds 2,000 s throughout the measuring temperature range, the crystallizability is excessively reduced thereby likely to cause the deformation of the multi-layer structure and multi-layer shaped articles due to the softened polyamide layer upon the hot waster treatment, although the fabricability is improved. In addition, pellets and powders are likely to be fuse-bonded to each other during the drying step or the solid-phase polymerization process to make the production of the multi-layer structure and its raw materials difficult.

The depolarization photometry used herein is a method of measuring the degree of crystallization of resins by an apparatus equipped with a light source, a polarizing plate and a light-receiving element, utilizing the phenomenon of the birefringence of light passing through resins due to crystallization. When an amorphous or molten resin is crystallized, a quantity of light transmitted through the polarizing plate varies in proportion to the degree of crystallization. The isothermal crystallization is a method of crystallizing an amorphous or molten resin at arbitrary temperature within the range from its glass transition point to less than its melting point. The half crystallization time is the time to be taken until reaching half the amount of the transmitted light which varies depending on the measuring conditions, namely the time to be taken until the half of the resin is crystallized, and is used as the index of the crystallization rate.

The melting point of the polyamide resin used in the present invention is preferably controlled to 180 to 235° C., more preferably 180 to 220° C. By setting the melting point of the polyamide resin close to those of other thermoplastic resins, the generation of malodor and discoloration due to the degradation of resins during the fabrication of the multi-layer structure can be decreased.

The polyamide resin used in the present invention has an oxygen gas transmission coefficient of 0.01 to 0.15 cc.mm/$m^2$.day.atm when measured at 23° C. and 60% relative humidity. It is preferred for the gas-barrier multi-layer structure to have a gas transmission coefficient as low as possible. If exceeding 0.15 cc.mm/$m^2$.day.atm, it is necessary to increase the thickness of the polyamide resin layer to attain gas-barrier properties meeting the practical use, thereby reducing the fabricability and mechanical properties of the multi-layer shaped articles. In addition, the increased amount of use of the polyamide which is more expensive than polyolefins, PET, etc, is economically disadvantageous and not practical.

Therefore, in the present invention, by using the polyamide resin having an oxygen gas transmission coefficient of 0.01 to 0.15 cc.mm/$m^2$.day.atm, and by regulating the thickness of the gas-barrier layer A within 1 to 50% of the overall thickness of the multi-layer structure, the multi-layer structure having good gas-barrier properties and fabricability simultaneously with good mechanical properties can be obtained. If less than 1%, the gas-barrier properties of the multi-layer structure is insufficient. If exceeding 50%, the fabricability such as deep drawing ability is reduced, although the gas-barrier properties are sufficient.

Examples of the thermoplastic resins for the thermoplastic resin layer B include polyolefins, polystyrenes, polyesters, polycarbonates, ethylene-vinyl alcohol copolymer resins (EVOH) and polyamides other than the polyamides for the gas-barrier layer A. The polyolefins may include polyethylene, polypropylene, copolymers of at least two olefins selected from ethylene, propylene, butene, etc., or mixtures of the preceding polymers. Polypropylene may include atactic homopolypropylene, isotactic homopolypropylene, syndiotactic homopolypropylene, random or block copolymers of propylene with a small amount of ethylene or α-olefin, composite materials of polypropylene compounded with an additive such as a nucleating agent, although not particularly limited thereto. Polyolefins, polyesters, polycarbonates and polyamides described above may be used as a mixture unless the transparency is not completely lost by mixing. The thickness of the thermoplastic resin layer B before subjected to fabrication is preferably 0.03 to 5 mm.

In the multi-layer structure of the present invention, an adhesive resin layer (adhesive layer) may be provided between adjacent two layers of the gas-barrier layer A and the thermoplastic resin layer B. Examples of the adhesive resin for the adhesive resin layer include modified polyethylenes, modified polypropylenes and copolymers of olefins such as ethylene, propylene and butene for bonding a thermoplastic resin layer B comprising polyolefins, and ethylene-vinyl acetate-based copolymers, ethylene-acrylic acid-based copolymers crosslinked with alkali metal or alkaline earth metal and ethylene-acrylic ester-based copolymers for bonding a thermoplastic resin layer B comprising polyesters or polycarbonates, although not particularly limited thereto. The thickness of the adhesive resin layer before subjected to fabrication is preferably 0.01 to 0.05 mm.

The polyamide resin for the gas-barrier layer A preferably has a glass transition point (Tg) of 85 to 110° C., and the thermoplastic resin for the thermoplastic resin layer B preferably has a Vicat softening point of Tg to Tg+70° C. when measured according to JIS K-7206, wherein Tg is the glass transition point of the polyamide resin. By controlling both the glass transition point of the polyamide resin for the gas-barrier layer A and the Vicat softening point of the thermoplastic resin for the thermoplastic resin layer B to 85° C. or higher, the resultant multi-layer structure shows a good heat resistance without deformation or shrinkage upon filled with a hot water. If the Vicat softening point of the thermoplastic resin is higher than Tg+70° C., the polyamide resin becomes easy to be crystallized at an adequate temperature of the fabrication such as thermoforming. If the glass transition point of the polyamide resin exceeds 110° C., the crystallizability is excessively reduced and the influence of the depression of the glass transition point due to water absorption becomes remarkable to make the heat resistance of the multi-layer structure insufficient for practical use.

The respective resin layers of the multi-layer structure of the present invention may contain various additives such as lubricants, mold release agents, antioxidants, ultraviolet absorbers, phyllosilicates, inorganic or organic salts of metal such as Co, Mn or Zn, etc., and complexes.

The multi-layer structure of the present invention may include multi-layer sheets and films comprising a laminate of at least two layers of the gas-barrier layer A containing the polyamide resin and the thermoplastic resin layer B, optionally containing the adhesive resin layer. The laminated layered structure is preferably, from the innermost layer to the outermost layer, layer B/adhesive layer/layer A/adhesive layer/layer B; layer B/adhesive layer/layer A/layer B; layer B/recycle layer/adhesive layer/layer A/adhesive layer/layer B; layer B/adhesive layer/layer A/adhesive layer/recycle layer/layer B; layer B/recycle layer/adhesive layer/layer A/adhesive layer/recycle layer/layer B; layer B/adhesive layer/layer A, or layer B/recycle layer/adhesive layer/layer A, and more specifically, polyolefin layer/adhesive layer/layer A/adhesive layer/polyolefin layer; polyolefin layer/adhesive layer/layer A/nylon layer; or polyolefin layer/adhesive layer/layer A/EVOH layer/nylon layer. The recycle layer is the layer made of scrap resins, etc. produced in the molding process for the multi-layer structure and the thermoforming process of the multi-layer structure. The overall thickness of the multi-layer structure is preferably 0.05 to 5 mm. The multi-layer shaped articles may include containers such as cups, cans and bags. When applied to containers for water-containing foodstuffs or beverages which are to be hot-filled, the innermost layer of the multi-layer structure to be brought in to contact with the water-containing foodstuffs or beverages is preferably the thermoplastic resin layer B made of a thermoplastic resin other than polyamide resins so as to prevent the deterioration of gas-barrier properties and mechanical properties due to the water absorption of the polyamide resin layer.

The multi-layer structure of the present invention may be produced by co-extrusion using an inflation method (blown film extrusion) or T-die method, or by co-injection molding called as sandwich molding or two-color molding in which two or more molten resins are successively injected into a mold.

The multi-layer container of the present invention is obtained by forming at least a part thereof from the multi-layer structure. Although the multi-layer structure such as sheets and films produced by co-extrusion or co-injection molding may be used as extruded or as molded, or used after made into containers by bonded together by slight heating, heat sealing or other methods, the multi-layer structure is usually fabricated into containers such as cups by vacuum forming, pressure forming, etc. The multi-layer structure of sheet form may be made into bags by stretching and subsequent bonding by heat-sealing or other bonding methods.

To fabricate the multi-layer structure by vacuum forming or pressure forming, it is necessary to heat the multi-layer structure to a temperature suitable for thermoforming. When preheating before the fabrication, the surface of the multi-layer structure should be heated to temperatures not lower than the softening point of the thermoplastic resin for the thermoplastic resin layer B. Despite such a heating, good shaped articles can be obtained without fabricating defects due to the crystallization of the polyamide resin layer.

The multi-layer container of the present invention is suitable for storing or preserving liquid foodstuffs, high water content foodstuffs and low water content foodstuffs. The liquid foodstuffs may include beverages such as carbonated drink, juice, water, milk, Japanese sake, whisky, Japanese spirits, coffee, tea, jelly drink, and health drink; seasonings such as flavoring liquid, Worcester sauce, soybean sauce, dressing, liquid stock, mayonnaise, soybean paste, and grated spice; livestock products such as ham and sausage; paste foodstuffs such as jam, cream, and chocolate paste; and liquid processed foodstuffs such as liquid soup, boiled meat and vegetable, pickles, and stew. The high moisture foodstuffs may include fresh or boiled noodles such as wheat noodle and ramen noodle; non-cooked rice such as polished rice, moisture-controlled rice and washing-free rice; cooked rice; processed rice such as cooked rice with various ingredients, cooked rice with red beans, and rice gruel; and seasoning powders such as soup powder and stock powder. The low moisture foodstuffs may include dried vegetables, coffee beans, coffee powders, tea leaves, and cookies made of grains. The multi-layer container of the present invention is also suitable for storing and preserving solid or liquid chemicals such as herbicide and pesticide, liquid or paste medicines, cosmetic lotions, cosmetic creams, cosmetic milky lotions, cosmetic hair stuffs, hairdyes, shampoos, soaps, detergents, etc.

The present invention will be described in more detail below with reference to the examples and comparative examples. However, these examples are only illustrative and not intended to limit the scope of the invention thereto.

In the following examples and comparative examples, evaluations were made by the following methods.

(1) Relative Viscosity

Accurately weighed 1 g of a polyamide resin was dissolved in 100 ml of 96% sulfuric acid at 20 to 30° C. under stirring. After completing the dissolution, 5 ml of the resultant solution was immediately placed into a Canon Fenske viscometer, which was allowed to stand in a thermostatic chamber maintained at 25±0.03° C. for 10 min, and then the dropping time (t) was measured. Separately, the dropping time ($t_0$) of the 96% sulfuric acid was measured. The relative viscosity was calculated from the measured dropping times t and $t_0$ according to the following formula A:

$$\text{Relative Viscosity} = t/t_0 \qquad (A)$$

(2) Half Crystallization Time

Measured by depolarization photometry using a polymer crystallization rate measuring apparatus "Model MK701" available from Kotaki Seisakusho Co., Ltd., under the following conditions:
Sample Melting Temperature: 260° C.
Sample Melting Time: 3 min
Crystallization Bath Temperature: 160° C.

(3) Melting Point of Polymer

Measured using a flow velocity differential scanning calorimeter "DSC-50" available from Shimadzu Corporation, under the following conditions:
Control: α-alumina
Sampling Amount: 10 mg
Temperature Rise Rate: 10° C./min
Measuring Temperature Range: 25 to 300° C.
Atmosphere: Nitrogen Gas 30 ml/min (4) Haze and Yellowness Measured according to JIS K-7105 (ASTM D-1003) using a color difference/turbidity measuring apparatus "COH-300A" available from Nippon Denshoku Industries Co., Ltd.

(5) Oxygen Transmission Coefficient/Oxygen Transmission Rate

Measured according to JIS K-7126 (ASTM D3985) at 23° C. and 60% relative humidity using an oxygen transmission rate analyzer "Model OX-TRAN 10/50A" available from Modern Controls Co., Ltd.

EXAMPLE 1

A jacketed reactor equipped with a stirrer, a partial condenser, a cooler, a thermometer, a dropping tank and a nitrogen inlet was charged with a mixture of 96 mol % of adipic acid and 4 mol % of isophthalic. After the reactor was fully purged with nitrogen, the temperature was raised to 170° C. under nitrogen flow to fluidize the dicarboxylic acids, to which m-xylylenediamine was then added dropwise under stirring. During the addition, the inner temperature was continuously raised to 245° C., and water produced upon the dropwise addition of m-xylylenediamine was removed out of the reaction system through the partial condenser and the cooler. After the dropwise addition of m-xylylenediamine, the inner temperature was continuously raised to 255° C. at which the reaction was continued for 15 min. Thereafter, the inner pressure of the reaction system was continuously reduced to 600 mmHg over 10 min, and then the reaction was further continued for 40 min while continuously raising the reaction temperature to 260° C.

After the reaction, the inner pressure of the reactor was raised to 0.2 MPa by nitrogen gas to discharge the resultant polymer in the form of strand through a nozzle at a lower portion of the polymerization tank. The strand was water-cooled and cut into polyamide pellets. The obtained polyamide had a relative viscosity of 2.1 and a melting point of 234° C.

A stainless rotary drum heater charged with the pellets was rotated at 5 rpm. The rotary drum heater was fully purged with nitrogen, and the reaction system was heated from room temperature to 140° C. under a small nitrogen flow. When the temperature reached 140° C., the pressure of the reaction system was reduced to 1 torr or lower, followed by raising the temperature of the reaction system to 180° C. over 110 min. After the temperature reached 180° C., the reaction was continued at the same temperature for 180 min. After the reaction, the pressure of the reaction system was returned to atmospheric pressure, and the temperature was reduced under nitrogen flow to 60° C. at which the pellets were taken out of the heater to obtain Polyamide 1.

Polyamide 1 had a relative viscosity of 2.5, a melting point of 234° C. and a glass transition point of 91° C. Polyamide 1 was extruded from a small-size T-die single screw extruder "Labo Plastomill" available from Toyo Seiki Seisaku-sho, Ltd. into a single-layer non-stretched film. The film had a half crystallization time of 47 s and an oxygen transmission coefficient of 0.07 cc.mm/m$^2$.day.atm.

Using a multi-layer sheet forming apparatus comprising three extruders, feed block, T die and take-up unit, Polyamide 1 for layer A, polypropylene ("FY-6C" available from Mitsubishi Chemical Corp.; Vicat softening point: 150° C.) for layer B, and modified polypropylene ("Modick P-513V" available from Mitsubishi Chemical Corp.) for adhesive layer for bonding the layers A and B were made into a three-kind, five-layer sheet having a structure of layer B/adhesive layer/layer A/adhesive layer/layer B. The extrusion temperatures in the sheet formation were 240° C. for the layer A, 220° C. for the adhesive layer and 240° C. for the layer B, and the temperature of the feed block was 245° C. Malodor due to the degradation of polypropylene during the extrusion was very slight. The multi-layer sheet had a haze of 27%, a yellowness of 1.0, and an overall thickness of 0.8 mm. The thickness of the layer A was 0.04 mm.

The multi-layer sheet was fabricated into a cup container having a depth of 26 mm, an opening diameter of 64 mm and a bottom diameter of 53 mm by a thermal deep drawing using a vacuum/pressure forming machine. The thermal forming was conducted by heating the surface of the sheet to 170° C. using a ceramic heater and then immediately forming the sheet by a vacuum/pressure forming. The thermal formability of the multi-layer sheet into the container was good, and a highly transparent container having the layer A with a uniform thickness was obtained. The haze of the bottom thereof was 28%.

To evaluate the oxygen transmission rate, the container containing water was hermetically sealed with a heat-sealing aluminum foil which was fuse-bonded to the container by a heat-sealing machine. The oxygen transmission rate was 0.006 cc/container.day.0.21 atm when measured at 23° C. and a surrounding relative humidity of 50%.

The container containing water was subject to a hot water treatment under pressure at 120° C. for 30 min in a retort autoclave available from Tomy Seiko Co., Ltd. The haze of the bottom portion after the hot water treatment under pressure was 30%, this indicating that the container maintained the original transparency and shape even after the hot water treatment under pressure. After the hot water treatment under pressure, the aluminum foil was removed from the container, but no particular odor was noticed.

EXAMPLE 2

The same procedure as in Example 1 was repeated except that a dicarboxylic acid component composed of 94 mol % of adipic acid and 6 mol % of isophthalic acid was used, thereby producing a polyamide resin for the layer A (Polyamide 2), a single-layer non-stretched film, a multi-layer sheet and a container.

Polyamide 2 had a relative viscosity of 2.5, a melting point of 232° C. and a glass transition point of 92° C. The single-layer non-stretched film had a half crystallization time of 62 s and an oxygen transmission coefficient of 0.07 cc.mm/m$^2$.day.atm.

The extrusion temperatures in the sheet formation were 240° C. for the layer A, 220° C. for the adhesive layer and 240° C. for the layer B, and the temperature of the feed block was 245° C. Malodor due to the degradation of polypropylene during the extrusion was very slight.

The multi-layer sheet had a haze of 26%, a yellowness of 0.9, and an overall thickness of 0.8 mm. The thickness of the layer A was 0.04 mm.

The thermal formability of the multi-layer sheet into the container was good, and a highly transparent container having the layer A with a uniform thickness was obtained. The haze of the bottom thereof was 26%.

To evaluate the oxygen transmission rate, the container containing water was hermetically sealed with a heat-sealing aluminum foil which was fuse-bonded to the container by a heat-sealing machine. The oxygen transmission rate was 0.006 cc/container.day.0.21 atm when measured at 23° C. and a surrounding relative humidity of 50%.

The container containing water was subject to a hot water treatment in the same manner as in Example 1. The haze of the bottom portion after the hot water treatment under pressure was 28%, this indicating that the container maintained the original transparency and shape even after the hot water treatment under pressure. After the hot water treatment under pressure, the aluminum foil was removed from the container, but no particular odor was noticed.

EXAMPLE 3

The same procedure as in Example 1 was repeated except that a dicarboxylic acid component composed of 85 mol % of adipic acid and 15 mol % of isophthalic acid was used, thereby producing a polyamide resin for the layer A (Polyamide 3), a single-layer non-stretched film, a multi-layer sheet and a container.

Polyamide 3 had a relative viscosity of 2.5, a melting point of 216° C. and a glass transition point of 98° C. The single-layer non-stretched film had a half crystallization time of 455 s and an oxygen transmission coefficient of 0.07 cc.mm/m$^2$.day.atm.

The extrusion temperatures in the sheet formation were 230° C. for the layer A, 220° C. for the adhesive layer and 240° C. for the layer B, and the temperature of the feed block was 235° C. Malodor due to the degradation of polypropylene during the extrusion was very slight.

The multi-layer sheet had a haze of 27%, a yellowness of 0.9, and an overall thickness of 0.8 mm. The thickness of the layer A was 0.04 mm.

The thermal formability of the multi-layer sheet into the container was good, and a highly transparent container having the layer A with a uniform thickness was obtained. The haze of the bottom thereof was 28%.

To evaluate the oxygen transmission rate, the container containing water was hermetically sealed with a heat-sealing aluminum foil which was fuse-bonded to the container by a heat-sealing machine. The oxygen transmission rate was 0.006 cc/container.day.0.21 atm when measured at 23° C. and a surrounding relative humidity of 50%.

The container containing water was subject to a hot water treatment in the same manner as in Example 1. The haze of the bottom portion after the hot water treatment under pressure was 28%, this indicating that the container maintained the original transparency and shape even after the hot water treatment under pressure. After the hot water treatment under pressure, the aluminum foil was removed from the container, but no particular odor was noticed.

EXAMPLE 4

The same procedure as in Example 1 was repeated except that a dicarboxylic acid component composed of 80 mol % of adipic acid and 20 mol % of isophthalic acid was used, thereby producing a polyamide resin for the layer A (Polyamide 4), a single-layer non-stretched film, a multi-layer sheet and a container.

Polyamide 4 had a relative viscosity of 2.4, a melting point of 207° C. and a glass transition point of 102° C. The single-layer non-stretched film had a half crystallization time of 1570 s and an oxygen transmission coefficient of 0.08 cc.mm/m$^2$.day.atm.

The extrusion temperatures in the sheet formation were 220° C. for the layer A, 220° C. for the adhesive layer and 240° C. for the layer B, and the temperature of the feed block was 235° C. Malodor due to the degradation of polypropylene during the extrusion was very slight.

The multi-layer sheet had a haze of 29%, a yellowness of 1.0, and an overall thickness of 0.8 mm. The thickness of the layer A was 0.04 mm.

The thermal formability of the multi-layer sheet into the container was good, and a highly transparent container having the layer A with a uniform thickness was obtained. The haze of the bottom thereof was 29%.

To evaluate the oxygen transmission rate, the container containing water was hermetically sealed with a heat-sealing aluminum foil which was fuse-bonded to the container by a heat-sealing machine. The oxygen transmission rate was 0.007 cc/container.day.0.21 atm when measured at 23° C. and a surrounding relative humidity of 50%.

The container containing water was subject to a hot water treatment in the same manner as in Example 1. The haze of the bottom portion after the hot water treatment under pressure was 32%, this indicating that the container maintained the original transparency and shape even after the hot water treatment under pressure. After the hot water treatment under pressure, the aluminum foil was removed from the container, but no particular odor was noticed.

EXAMPLE 5

The same procedure as in Example 2 was repeated except for changing the overall thickness of the multi-layer sheet to 0.8 mm and the thickness of the layer A to 0.10 mm, thereby producing a multi-layer sheet and a container.

The multi-layer sheet had a haze of 26% and a yellowness of 0.9.

The thermal formability of the multi-layer sheet into the container was good, and a highly transparent container having the layer A with a uniform thickness was obtained. The haze of the bottom thereof was 26%.

To evaluate the oxygen transmission rate, the container containing water was hermetically sealed with a heat-sealing aluminum foil which was fuse-bonded to the container by a heat-sealing machine. The oxygen transmission rate was 0.003 cc/container.day.0.21 atm when measured at 23° C. and a surrounding relative humidity of 50%.

The container containing water was subject to a hot water treatment in the same manner as in Example 1. The haze of the bottom portion after the hot water treatment under pressure was 28%, this indicating that the container maintained the original transparency and shape even after the hot water treatment under pressure. After the hot water treatment under pressure, the aluminum foil was removed from the container, but no particular odor was noticed.

EXAMPLE 6

A dry blend of 97 parts by mass of Polyamide 2 and 3 parts by mass of a phyllosilicate "Orben" available from Shiraishi Kogyo Co., Ltd. (containing 34% by weight of trimethyloctadecylammonium as a lubricant) was fed in a feeding rate of 6 kg/h into a corotating twin-screw extruder (cylinder diameter: 20 mmφ) disposed with screws having a residence portion provided by a reverse element, melt-kneaded at a cylinder temperature of 270° C., extruded from an extrusion heat into strands, cooled and pelletized to prepare a composite polyamide resin (Polyamide 9). The same procedure as in Example 2 was repeated except that Polyamide 9 was used as the polyamide resin for the layer A, thereby producing a single-layer non-stretched film, a multi-layer sheet and a container.

Polyamide 9 had a relative viscosity of 2.5, a melting point of 232° C. and a glass transition point of 92° C. The single-layer non-stretched film had a half crystallization time of 58 s and an oxygen transmission coefficient of 0.04 cc.mm/m$^2$.day.atm.

The extrusion temperatures in the sheet formation were 240° C. for the layer A, 220° C. for the adhesive layer and 240° C. for the layer B, and the temperature of the feed block was 245° C. Malodor due to the degradation of polypropylene during the extrusion was very slight.

The multi-layer sheet had a haze of 26%, a yellowness of 1.0, and an overall thickness of 0.8 mm. The thickness of the layer A was 0.04 mm.

The thermal formability of the multi-layer sheet into the container was good, and a highly transparent container having the layer A with a uniform thickness was obtained. The haze of the bottom thereof was 26%.

To evaluate the oxygen transmission rate, the container containing water was hermetically sealed with a heat-sealing aluminum foil which was fuse-bonded to the container by a heat-sealing machine. The oxygen transmission rate was 0.004 cc/container.day.0.21 atm when measured at 23° C. and a surrounding relative humidity of 50%.

The container containing water was subject to a hot water treatment in the same manner as in Example 1. The haze of the bottom portion after the hot water treatment under pressure was 28%, this indicating that the container maintained the original transparency and shape even after the hot water treatment under pressure. After the hot water treatment under pressure, the aluminum foil was removed from the container, but no particular odor was noticed.

COMPARATIVE EXAMPLE 1

The same procedure as in Example 1 was repeated except that a dicarboxylic acid component composed of 100 mol % of adipic acid was used, thereby producing a polyamide resin for the layer A (Polyamide 5), a single-layer non-stretched film, a multi-layer sheet and a container.

Polyamide 5 had a relative viscosity of 2.6, a melting point of 240° C. and a glass transition point of 88° C. The single-layer non-stretched film had a half crystallization time of 25 s and an oxygen transmission coefficient of 0.09 cc.mm/m².day.atm.

The extrusion temperatures in the sheet formation were 260° C. for the layer A, 220° C. for the adhesive layer and 240° C. for the layer B, and the temperature of the feed block was 255° C. Malodor due to the degradation of polypropylene was noticed, and white fume was observed at the discharge end of the extruder.

The multi-layer sheet had a haze of 33%, a yellowness of 1.2, and an overall thickness of 0.8 mm. The thickness of the layer A was 0.04 mm.

During the thermal formation of the multi-layer sheet into the container, the sheet was unevenly elongated and partially whitened because of the crystallization of the layer A. The thicknesses of the intermediate layers were also uneven. The haze of bottom portion other than the whitened area was 52%.

To evaluate the oxygen transmission rate, the container containing water was hermetically sealed with a heat-sealing aluminum foil which was fuse-bonded to the container by a heat-sealing machine. The oxygen transmission rate was 0.009 cc/container.day.0.21 atm when measured at 23° C. and a surrounding relative humidity of 50%.

The container containing water was subject to a hot water treatment in the same manner as in Example 1. The haze of the bottom portion after the hot water treatment under pressure was 55%, although the original shape was maintained. After the hot water treatment under pressure, the removal of the aluminum foil from the container gave malodor due to degraded resins.

COMPARATIVE EXAMPLE 2

The same procedure as in Example 1 was repeated except that a dicarboxylic acid component composed of 98 mol % of adipic acid and 2 mol % of isophthalic acid was used, thereby producing a polyamide resin for the layer A (Polyamide 6), a single-layer non-stretched film, a multi-layer sheet and a container.

Polyamide 6 had a relative viscosity of 2.6, a melting point of 237° C. and a glass transition point of 90° C. The single-layer non-stretched film had a half crystallization time of 35 s and an oxygen transmission coefficient of 0.07 cc.mm/m².day.atm.

The extrusion temperatures in the sheet formation were 260° C. for the layer A, 220° C. for the adhesive layer and 240° C. for the layer B, and the temperature of the feed block was 255° C. Malodor due to the degradation of polypropylene was noticed, and white fume was observed at the discharge end of the extruder.

The multi-layer sheet had a haze of 32%, a yellowness of 1.2, and an overall thickness of 0.8 mm. The thickness of the layer A was 0.04 mm.

During the thermal formation of the multi-layer sheet into the container, the sheet was unevenly elongated and partially whitened because of the crystallization of the layer A. The thicknesses of the intermediate layers were also uneven. The haze of bottom portion other than the whitened area was 41%.

To evaluate the oxygen transmission rate, the container containing water was hermetically sealed with a heat-sealing aluminum foil which was fuse-bonded to the container by a heat-sealing machine. The oxygen transmission rate was 0.006 cc/container.day.0.21 atm when measured at 23° C. and a surrounding relative humidity of 50%.

The container containing water was subject to a hot water treatment in the same manner as in Example 1. The haze of the bottom portion after the hot water treatment under pressure was 50%, although the original shape was maintained. After the hot water treatment under pressure, the removal of the aluminum foil from the container gave malodor due to degraded resins.

COMPARATIVE EXAMPLE 3

The same procedure as in Example 1 was repeated except that a mixture containing 70% by weight of Polyamide 6 and 30% by weight of an amorphous nylon resin "SELAR PA" available from Mitsui DuPont Chemical Co., Ltd., was used as the polyamide resin for the layer A, thereby producing a single-layer unstretched film, a multi-layer sheet and a container.

The single-layer non-stretched film had a half crystallization time of 297 s and an oxygen transmission coefficient of 0.16 cc.mm/m².day.atm.

The extrusion temperatures in the sheet formation were 260° C. for the layer A, 220° C. for the adhesive layer and 240° C. for the layer B, and the temperature of the feed block was 255° C. Malodor due to the degradation of polypropylene was noticed, and white fume was observed at the discharge end of the extruder.

The multi-layer sheet had a haze of 36%, a yellowness of 1.2, and an overall thickness of 0.8 mm. The thickness of the layer A was 0.04 mm.

The thermal formability of the multi-layer sheet into the container was good, and a transparent container having the layer A with a uniform thickness was obtained. The haze of the bottom thereof was 30%.

To evaluate the oxygen transmission rate, the container containing water was hermetically sealed with a heat-sealing aluminum foil which was fuse-bonded to the container by a heat-sealing machine. The oxygen transmission rate was 0.014 cc/container.day.0.21 atm when measured at 23° C. and a surrounding relative humidity of 50%.

The container containing water was subject to a hot water treatment in the same manner as in Example 1. The haze of the bottom portion after the hot water treatment under pressure was 30%, and the original shape was maintained. After the hot water treatment under pressure, the removal of the aluminum foil from the container gave malodor due to degraded resins.

COMPARATIVE EXAMPLE 4

The same procedure as in Example 1 was repeated except that a dicarboxylic acid component composed of 75 mol % of adipic acid and 25 mol % of isophthalic acid was used, thereby producing a polyamide resin for the layer A (Polyamide 7), a single-layer non-stretched film, a multi-layer sheet and a container.

Polyamide 7 had a relative viscosity of 2.5 and a glass transition point of 105° C., but showed no definite melting point. The single-layer non-stretched film showed no depolarization by crystallization even after the elapse of 2,000 s or longer when subjected to a crystallization treatment at constant temperature of 160° C. The oxygen transmission coefficient of the film was 0.09 cc.mm/m².day.atm.

The extrusion temperatures in the sheet formation were 220° C. for the layer A, 220° C. for the adhesive layer and 220° C. for the layer B, and the temperature of the feed block was 230° C. Malodor due to the degradation of polypropylene during the extrusion was very slight.

The multi-layer sheet had a haze of 28%, a yellowness of 2.2, and an overall thickness of 0.8 mm. The thickness of the layer A was 0.04 mm.

The thermal formability of the multi-layer sheet into the container was good, and a transparent container having the layer A with a uniform thickness was obtained. The haze of the bottom thereof was 26%.

To evaluate the oxygen transmission rate, the container containing water was hermetically sealed with a heat-sealing aluminum foil which was fuse-bonded to the container by a heat-sealing machine. The oxygen transmission rate was 0.009 cc/container.day.0.21 atm when measured at 23° C. and a surrounding relative humidity of 50%.

The container containing water was subject to a hot water treatment in the same manner as in Example 1. The haze of the bottom portion after the hot water treatment under pressure was 35%, and the original shape was deformed by the hot water treatment under pressure. After the hot water treatment under pressure, the aluminum foil was removed from the container, but no particular odor was noticed.

COMPARATIVE EXAMPLE 5

The same procedure as in Example 1 was repeated except that a dicarboxylic acid component composed of 60 mol % of adipic acid and 40 mol % of isophthalic acid was used, thereby producing a polyamide resin for the layer A (Polyamide 8), a single-layer non-stretched film, a multi-layer sheet and a container.

Polyamide 8 had a relative viscosity of 2.3 and a glass transition point of 115° C., but showed no definite melting point. The single-layer non-stretched film showed no depolarization by crystallization even after the elapse of 2,000 s or longer when subjected to a crystallization treatment at constant temperature of 160° C. The oxygen transmission coefficient of the film was 0.10 cc.mm/m$^2$.day.atm.

The extrusion temperatures in the sheet formation were 200° C. for the layer A, 220° C. for the adhesive layer and 220° C. for the layer B, and the temperature of the feed block was 215° C. Malodor due to the degradation of polypropylene during the extrusion was very slight.

The multi-layer sheet had a haze of 26%, a yellowness of 2.4, and an overall thickness of 0.8 mm. The thickness of the layer A was 0.04 mm. The oxygen transmission coefficient of the layer A was 0.10 cc.mm/m$^2$.day.atm The thermal formability of the multi-layer sheet into the container was good, and a transparent container having the layer A with a uniform thickness was obtained. The haze of the bottom thereof was 30%.

To evaluate the oxygen transmission rate, the container containing water was hermetically sealed with a heat-sealing aluminum foil which was fuse-bonded to the container by a heat-sealing machine. The oxygen transmission rate was 0.010 cc/container.day.0.21 atm when measured at 23° C. and a surrounding relative humidity of 50%.

The container containing water was subject to a hot water treatment in the same manner as in Example 1. The haze of the bottom portion after the hot water treatment under pressure was 41%, and the original shape was deformed by the hot water treatment under pressure to cause the intermediate layers to protrude toward the outside.

The gas-barrier multi-layer structure of the present invention exhibits a good fabricability such as deep drawing ability and stretch blowing ability, and is excellent in the transparency and gas-barrier properties with less malodor generation and discoloration.

What is claimed is:

1. A gas-barrier multi-layer structure comprising at least one gas-barrier layer A and at least one thermoplastic resin layer B, the gas-barrier layer A comprising a crystallizable polyamide resin produced by polycondensing a diamine component containing 70 mol % or more of m-wylylenediamine with a dicarboxylic acid component consisting essentially of 80 to 97 mol % of a C4-C20α, ω-linear aliphatic dicarboxylic acid and 3 to 20 mol % of isophthalic acid, and the crystallizable polyamide resin having a minimum half crystallization time of 40 to 2,000 s in a measuring temperature range from a glass transition point thereof to less than a melting point thereof when measured by isothermal crystallization according to depolarization photometry, wherein the polycondensing is conducted by the following steps (1) and (2):

(1) melt-polymerizing the diamine component with the dicarboxylic acid component to produce polyamide; and then, (2) solid-phase polymerizing the polyamide obtained in step (1), wherein the relative viscosity t/t0 of the polyamide resin thus obtained is in the range of 2.3 to 4.2, wherein t denotes the dropping time of a solution, prepared by dissolving 1 g of a polyamide resin into 100 ml of 96% sulphuric acid, in a viscosimeter at 25° C., and t0 denotes the dropping time of the 96% sulphuric acid at the same condition, and wherein said solid-phase polymerizing is performed at a temperature in a range of 150° C. to the melting point of the polyamide.

2. The gas-barrier multi-layer structure according to claim 1, wherein the polyamide resin for the gas-barrier layer A has an oxygen transmission coefficient of 0.01 to 0.15 cc.mm/m$^2$.day.atm when measured at 23° C. and 60% relative humidity.

3. The gas-barrier multi-layer structure according to claim 1, wherein the polyamide resin for the gas-barrier layer A has a melting point of 180 to 235° C.

4. The gas-barrier multi-layer structure according to claim 1, wherein the polyamide resin for the gas-barrier layer A has a glass transition point of 85 to 110° C.

5. The gas-barrier multi-layer structure according to claim 1, wherein the thermoplastic resin for the thermoplastic resin layer B has a Vicat softening point of Tg to Tg+70° C. when measured according to JIS K-7206, wherein Tg is the glass transition point of the polyamide resin for the gas-barrier layer A.

6. The gas-barrier multi-layer structure according to claim 1, wherein the thermoplastic resin for the thermoplastic resin layer B is a polyolefin.

7. The gas-barrier multi-layer structure according to claim 1, wherein a thickness of the gas-barrier layer A is 1 to 50% of an overall thickness of the multi-layer structure.

8. The gas-barrier multi-layer structure according to claim 1, wherein the gas-barrier layer A and the thermoplastic resin layer B are laminated through an intervening adhesive resin layer.

9. The gas-barrier multi-layer structure according to claim 1, which is made into a form of a multi-layer container.

10. The gas-barrier multi-layer structure according to claim 1, wherein the relative viscosity of the polyamide obtained in the step (1) is in a range of 1.6 to 2.28.

11. The gas-barrier multi-layer structure according to claim 1, wherein the at least one thermoplastic resin layer B is at least one polypropylene layer B.

12. The gas-barrier multi-layer structure according to claim 1, wherein said at least one gas-barrier layer A has a uniform thickness.

13. The gas-barrier multiplayer structure according to claim 1, wherein said dicarboxylic acid components consists of 80 to 97 mol % of said C4-C20 $\alpha$, $\omega$-linear aliphatic dicarboxylic acid and 3 to 20 mol % of isophthalic acid.

* * * * *